Figure 1:
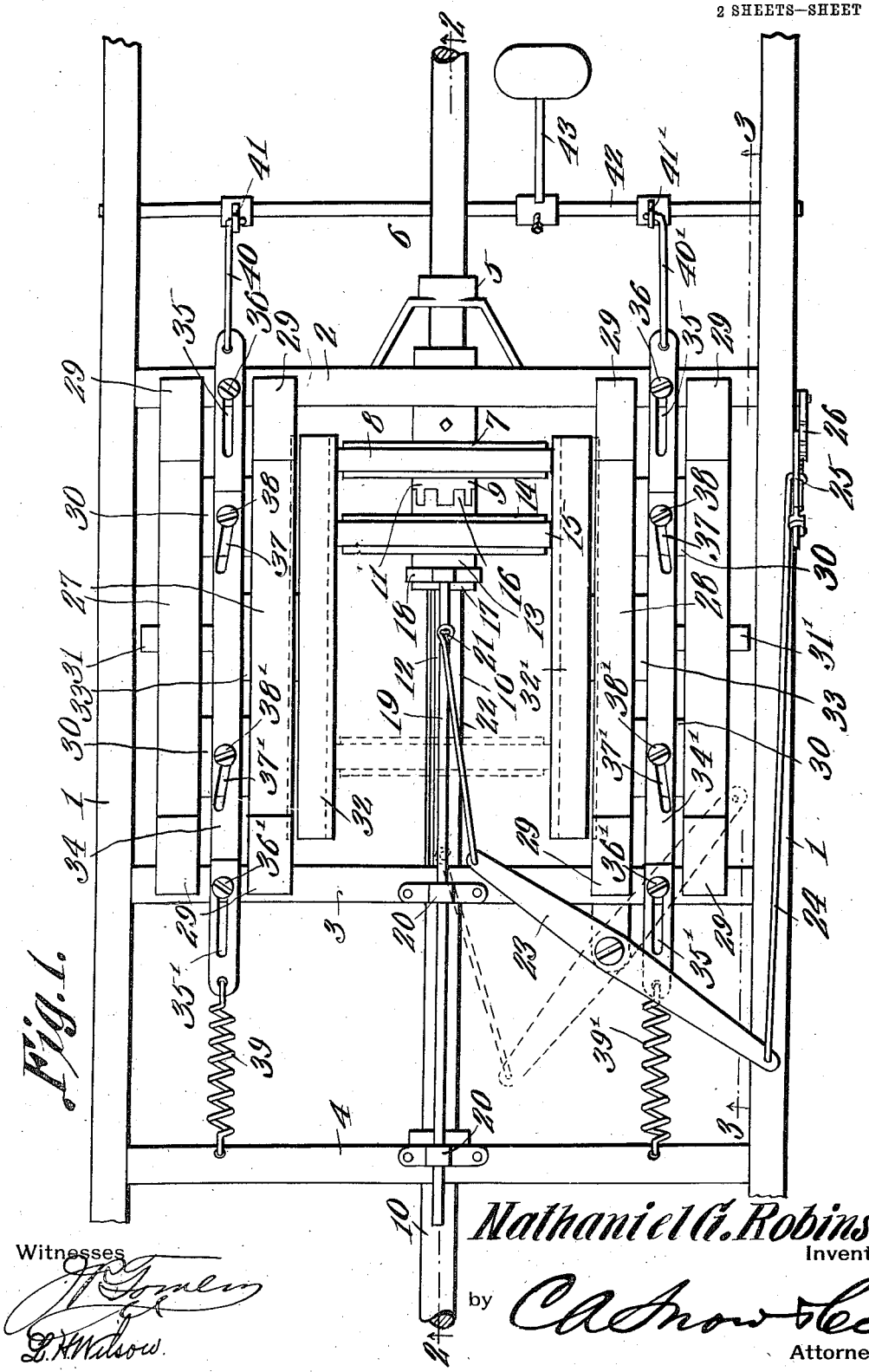

N. G. ROBINSON.
FRICTION POWER TRANSMISSION MECHANISM.
APPLICATION FILED APR. 24, 1912.

1,036,007.

Patented Aug. 20, 1912.
2 SHEETS—SHEET 1.

Witnesses

Nathaniel G. Robinson,
Inventor by C.A.Snow & Co.
Attorneys

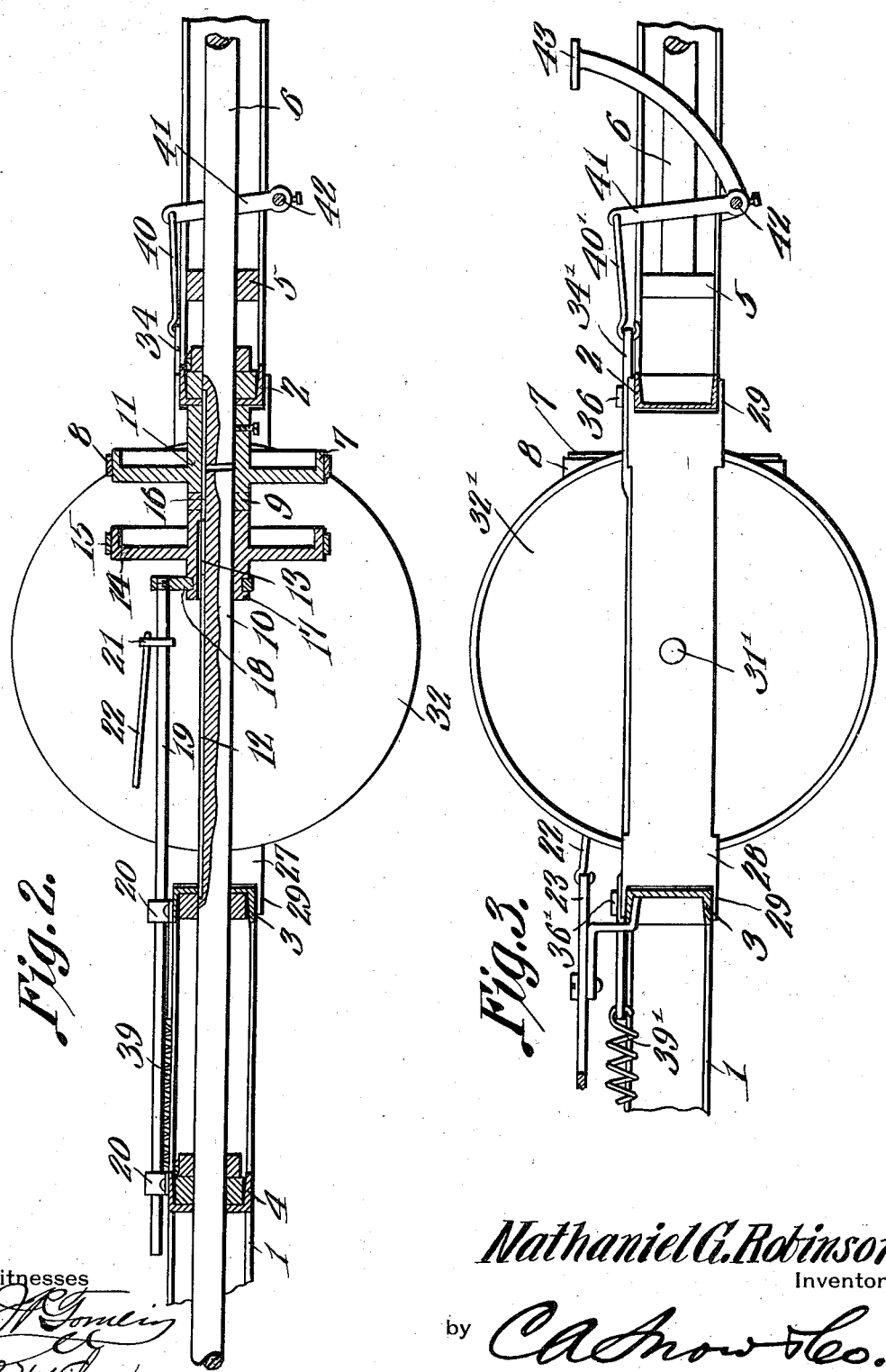

UNITED STATES PATENT OFFICE.

NATHANIEL G. ROBINSON, OF WOOLSTOCK, IOWA.

FRICTION POWER-TRANSMISSION MECHANISM.

1,036,007. Specification of Letters Patent. Patented Aug. 20, 1912.

Application filed April 24, 1912. Serial No. 692,975.

*To all whom it may concern:*

Be it known that I, NATHANIEL G. ROBINSON, a citizen of the United States, residing at Woolstock, in the county of Wright and State of Iowa, have invented a new and useful Friction Power-Transmission Mechanism, of which the following is a specification.

The present invention relates to improvements in friction power transmission mechanism, the primary object of the invention being the provision of a transmission mechanism of this character in which the driving and driven shafts are disposed in longitudinal alinement, the driving shaft having fixed thereon a friction drive wheel disposed for actuating two parallel friction disks, which are capable of movement to and from each other into and out of engagement with the periphery of the friction drive wheels, while keyed upon the driven shaft and disposed to be engaged between the friction disks is an auxiliary friction wheel, which has co-acting means to connect with the clutch means of the main friction drive wheel of the driving shaft to permit the direct connection of the driving and driven shafts for high speed without the intervention of the friction disks, there being a novel form of means for moving the friction disks into and out of engagement with the peripheries of the respective friction drive wheels.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a top plan view of the complete transmission mechanism, dotted lines illustrating the position of the friction disks when the driving shaft is directly connected with the driven shaft, and dash lines indicating the position of the shafts when the driven shaft is being rotated in a reverse direction to the driving shaft. Fig. 2 is a section on line 2—2 of Fig. 1. Fig. 3 is a section on line 3—3 of Fig. 1.

Referring to the drawings, the numeral 1 indicates the longitudinal plates of the main frame, which may be the frame or the chassis of an automobile and is properly spaced by means of the transverse beams 2, 3 and 4. A bearing bracket 5 is carried by the beam 2 on the forward face thereof and forms with the beam 2 a bearing for the main driving shaft 6, which is operably connected in the usual manner to a motor (not shown).

Keyed upon the inner end of the shaft 6 within the frame, is the main friction drive wheel 7 provided with the contact periphery 8, which is made of any desired material, such as leather. The inner hub of the drive wheel 7 is provided with the clutch teeth 9 and a socket 11 in which is disposed the forward end of the driving shaft 10, the said driving shaft 10 being journaled within the respective beams 3 and 4 of the frame and connected at its rear end through a differential or other mechanism with the driving axle or wheels of an automobile.

The driven shaft 10 is provided with the longitudinal key-way 12 for the reception of the key 13 carried by the friction wheel 14 provided with the friction periphery 15 similar to that of 8 and of substantially the same diameter. The inner portion of the hub of the friction wheel 14 is toothed as at 16, so that the teeth 16 and 9 may engage to directly connect the shaft 6 to the shaft 10 and thus provide a direct drive without any friction transmission mechanism therebetween. The other portion of the hub as at 17 of the friction wheel 14 is grooved to receive the strap or yoke 18 which has connected thereto the longitudinally slidable rod 19 journaled in the respective straps 20 carried by the transverse beams 3 and 4 of the frame. The lug 21 is connected to the rod 19 and by means of the link 22 and the double lever 23, the said friction wheel 14 may be moved to assume any position between the points indicated by the full and dash lines Fig. 1. In order to actuate the lever 23, a rod 24 is connected to the other end thereof and has its forward end connected to the operating lever 25, which is provided with the usual pawl and segment mechanism for retaining the lever and the wheel 14 at the desired position according to the speed at which the automobile or other mechanism is desired to be operated.

Mounted to span the respective beams 2 and 3 and to have a sliding movement transversely of the frame, are the two parallel plates 27 and 28, one pair of which is disposed each side of the respective shafts 6 and 10. All of these plates are provided with the recessed ends 29 which engage the respective upper and under sides of the beams 2 and 3 and thereby properly position the plates or bars 27 and 28 for proper movement between such beams 2 and 3.

Each of the respective plates or bars 27 and 28 are connected together in fixed relation by means of the blocks 30, while journaled in the respective bars are the short stub shafts 31 and 31' respectively, which have keyed upon their inner ends, the respective friction disks 32 and 32' respectively. Under normal conditions, the inner face of the respective disks 32 and 32' are in engagement with the peripheries 8 and 15 of the respective friction wheels 7 and 14, this position being when the driving shaft 6 is driving the driven shaft 10 at variable speed and reverse speed, but as heretofore described not when driving direct.

The bushings 33 provide a means for properly positioning the stub shafts 31 and 31' in the journals of the respective bars 27 and 28 and thus retain the disks 32 and 32' in the proper relative position at all times to the supporting plates therefor.

In order to actuate the disks 32 and 32' to move them to and from engagement with the peripheries of the wheels 7 and 14, the sliding plates 34 and 34', which are provided each with the two elongated straight slots 35 and 35', are mounted upon the respective beams 2 and 3 and held relatively thereto by means of the headed pins or screws 36 and 36'. By this means the plates may be moved longitudinally of the frame and retained in such relation at all times. Formed in the bodies of the plates 34 and 34' respectively, intermediate of the ends, are the inclined or cam slots 37, 37' which have passed therethrough the headed studs or pins 38 and 38' which are connected to the respective pairs of bars 27 and 28 respectively. By this means it will be seen that the movement of the respective plates 34 and 34' longitudinally of the frame, due to the pins 36—36' and 38—38' will cause the respective pairs of bars 27 and 28 to be moved transversely of the frame and consequently carry therewith the respective friction disks 32—32', thus moving them simultaneously outwardly and inwardly to permit the connection or disconnection of the disks thereof with the respective peripheries of the drive wheels 7 and 14. Under normal conditions the respective disks 32 and 32' are held in engagement with the friction wheels 7 and 14 by means of the springs 39 and 39' which are connected with the ends of the plates 34—34', but when it is desired to move the plates outwardly simultaneously, the shaft 42 is rocked, and through the links 40—40' and arms 41—41', the plates 34—34' are moved against the tension of the springs 39 and 39'. In order to permit of the easy actuation thereof the foot lever 43 is connected to the rock shaft 42 and is disposed in operable relation to the operator.

From the foregoing description, taken in connection with the drawings it is evident that when it is desired to form a direct drive from the shaft 6 to the shaft 10, that the foot lever 43 is operated to move the two friction disks 32 and 32' outwardly and out of engagement with the peripheries of the friction wheels 7 and 14 and that the lever 25 is operated to move the clutch teeth 9 and 16 into engagement as shown in Fig. 1. Should however, it be desired to operate the shafts 6 and 10 at varying speed or to reverse the same, the shaft 42 is actuated only for an instant to move the friction disks 32 and 32' outwardly and thus out of engagement with the peripheries of the friction wheels 7 and 14 so that the friction wheel 14 may be moved longitudinally of the shaft 10 to assume any position from the full line position Fig. 1 to the dash line position therein, such dash line position being the full reverse position, whereby the rotation of the friction wheel 7 after the shaft 32 has been released and the disk 32 and 32' have been actuated to engage the peripheries of the friction wheels 7 and 14, will operate the friction disks 32 and 32' and as the friction wheel 14 is upon the opposite side of the center of the disks 32 and 32' to the friction wheel 7, the shaft 10 will have imparted thereto an opposite or reverse rotation to the driving shaft 6.

What is claimed is:

1. In a friction power transmission mechanism, a frame, a driving shaft, a friction drive wheel keyed upon the inner end thereof and having a clutch member, a driven shaft in longitudinal alinement with the driving shaft and having its forward end seated within the hub of the friction wheel, another friction wheel slidably keyed upon the driven shaft and having a clutch member disposed to coöperate with the first clutch member to connect the shafts direct, two journal boxes slidably mounted in the frame, a friction disk carried by each journal box and disposed for movement into and out of engagement with the peripheries of the two friction wheels, two longitudinally slidable plates one to each journal box connected to the frame, and coacting means carried by the respective journal boxes and plates for imparting movement to the journal boxes toward and from the friction wheels.

2. In a friction power transmission mechanism, a frame, a driving shaft, a friction drive wheel keyed upon the inner end thereof and having a clutch member, a driven shaft in longitudinal alinement with the driving shaft and having its forward end seated within the hub of the friction wheel, another friction wheel slidably keyed upon the driven shaft and having a clutch member disposed to coöperate with the first clutch member to connect the shafts direct, two journal boxes slidably mounted in the frame, a friction disk carried by each journal box and disposed for movement into and out of engagement with the peripheries of the two friction wheels, two longitudinally slidable plates one to each journal box connected to the frame, said plates being provided with inclined cam slots through the body thereof, means for slidably attaching the journal boxes to the plates carried by the journal boxes and in engagement with the slots, a spring connected to the plates for normally holding the journal boxes and friction disks toward and in engagement with the friction wheels, and manually operated means connected to the plates for moving the same in opposition to the springs.

In testimony that I claim the foregoing as my own, I have hereto affixed my signature in the presence of two witnesses.

NATHANIEL G. ROBINSON.

Witnesses:
J. D. REED,
J. M. FREDERICKSEN.